(12) United States Patent
Hsu et al.

(10) Patent No.: US 11,644,873 B2
(45) Date of Patent: May 9, 2023

(54) HINGE FOR A FOLDABLE ELECTRONIC DEVICE WITH A FLEXIBLE DISPLAY

(71) Applicant: FOSITEK CORPORATION, New Taipei (TW)

(72) Inventors: An-Szu Hsu, New Taipei (TW); Chun-Han Lin, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 52 days.

(21) Appl. No.: 17/456,707

(22) Filed: Nov. 29, 2021

(65) Prior Publication Data
US 2023/0063210 A1 Mar. 2, 2023

(30) Foreign Application Priority Data
Aug. 30, 2021 (TW) ................. 110132024

(51) Int. Cl.
*G06F 1/16* (2006.01)
(52) U.S. Cl.
CPC .......... *G06F 1/1681* (2013.01); *G06F 1/1652* (2013.01)
(58) Field of Classification Search
CPC .............................. G06F 1/1681; G06F 1/1652
See application file for complete search history.

(56) References Cited

U.S. PATENT DOCUMENTS

| 375,394 | A | * | 12/1887 | Strachan | .................. E05D 1/04 63/7 |
| 2,770,834 | A | * | 11/1956 | Saverio | ..................... E05D 1/04 16/250 |
| 6,292,981 | B1 | * | 9/2001 | Ford | ........................ E05D 1/04 16/361 |
| 6,317,929 | B1 | * | 11/2001 | Ring | ........................ E05D 1/04 16/362 |
| 9,447,620 | B2 | * | 9/2016 | Park | ........................ H04M 1/04 |
| 9,879,715 | B1 | * | 1/2018 | Hsu | ....................... E05D 11/082 |
| 10,066,429 | B2 | * | 9/2018 | Park | ........................ E05D 1/04 |
| 10,309,137 | B2 | * | 6/2019 | Wu | ........................ F16C 11/04 |
| 10,501,973 | B2 | * | 12/2019 | Määttä | .................. G06F 1/1681 |
| 10,591,959 | B1 | * | 3/2020 | Hsu | ........................ G09F 9/301 |
| 10,664,021 | B1 | * | 5/2020 | Hsu | ....................... G06F 1/1626 |
| 11,016,541 | B2 | * | 5/2021 | Lin | ........................ E05D 3/122 |
| 11,287,853 | B2 | * | 3/2022 | Yao | ........................ G06F 1/1681 |
| 11,334,122 | B2 | * | 5/2022 | Hsu | ........................ F16C 11/04 |
| 11,336,759 | B2 | * | 5/2022 | Liao | ....................... G06F 1/1681 |
| 11,340,660 | B2 | * | 5/2022 | Nguyen | ................ G06F 1/1641 |

(Continued)

*Primary Examiner* — Jeffrey O'Brien
(74) *Attorney, Agent, or Firm* — Burris Law, PLLC (57) ABSTRACT

A hinge includes two brackets and a sliding module. Each bracket has a support shaft and a support plate for supporting a flexible display. The sliding module includes a rail seat, two rail keys, two axle keys and two auxiliary extending frames. The rail seat has two arcuate inboard rails, two receiving slots and two arcuate outboard rails. Each rail key has a key body received in the receiving slot, a sliding protrusion slidable along the arcuate inboard rail, and an arcuate key rail opposite to the sliding protrusion. The axle keys are slidable along the arcuate key rails, and are journalled on the support shafts. The auxiliary extending frames are slidable along the arcuate outboard rails and slidably connected with the support plates. With adjustment of the rails, moving paths of the keys are adjusted to meet the requirement of bending of the flexible display.

8 Claims, 11 Drawing Sheets

(56) References Cited

U.S. PATENT DOCUMENTS

| | | | |
|---|---|---|---|
| 11,353,931 B2* | 6/2022 | Hsu | G06F 1/1681 |
| 11,408,214 B1* | 8/2022 | Hsu | E05D 3/122 |
| 11,416,039 B2* | 8/2022 | Hsu | H04M 1/022 |
| 11,449,109 B2* | 9/2022 | Ou | G06F 1/1652 |
| 11,550,358 B2* | 1/2023 | Cheng | H04M 1/022 |
| 11,579,661 B2* | 2/2023 | Kinoshita | E05D 11/082 |
| 11,596,074 B2* | 2/2023 | Park | H05K 5/0226 |
| 2021/0055763 A1* | 2/2021 | Park | G06F 1/1681 |
| 2022/0035421 A1* | 2/2022 | Yao | G06F 1/1616 |
| 2022/0159109 A1* | 5/2022 | Kang | H04M 1/022 |
| 2022/0413562 A1* | 12/2022 | Kim | H04M 1/0268 |
| 2023/0067187 A1* | 3/2023 | Lin | G06F 1/1652 |

* cited by examiner

HINGE FOR A FOLDABLE ELECTRONIC DEVICE WITH A FLEXIBLE DISPLAY

CROSS-REFERENCE TO RELATED APPLICATION

This application claims priority of Taiwanese Patent Application No. 110132024, filed on Aug. 30, 2021.

FIELD

The disclosure relates to a hinge, and more particularly to a hinge for a foldable electronic device with a flexible display.

BACKGROUND

With development of flexible display screens, the foldable electronic device with a flexible display screen has progressively developed. Such foldable electronic device generally has a hinge to connect two housing bodies for supporting the flexible display screen and allowing folding and unfolding of the two housing bodies. The flexible display screen is subjected to tension and depressed during the folding and unfolding processes, which results in damage to the flexible display screen. Therefore, it is desirable to develop a hinge which can decrease the degree of tension and depression of a flexible display screen of a foldable electronic device during folding and unfolding processes.

SUMMARY

Therefore, an object of the disclosure is to provide a hinge that can meet a bending requirement of the flexible display of an electronic device.

According to an aspect of the disclosure, a hinge includes two brackets and at least one sliding module. Each bracket has a support shaft which extends in a first direction to have a pivot section and a carry section, and a support plate which is connected with and extends from the carry section in the first direction. The support plate has a major surface which cooperates with the carry section to define a support surface for supporting a flexible display, and a sliding major surface which is opposite to the support surface. The brackets are disposed in the first direction and have the pivot sections proximate to and spaced apart from each other in the first direction. The sliding module includes a rail seat, two rail keys, two axle keys and two auxiliary extending frames. The rail seat has a seat body which is disposed outboard of the brackets in a second direction that is transverse to the first direction, and which has two rail portions that are respectively aligned with the pivot sections of the brackets in the second direction, two arcuate inboard rails which are respectively formed in inboard sides of the rail portions, two receiving slots which are respectively formed in the inboard sides of the rail portions and in spatial communication with the arcuate inboard rails, respectively, and which are closer to the pivot sections than the arcuate inboard rails, and two arcuate outboard rails which are respectively formed in outboard sides of the rail portions. The arcuate inboard rails are aligned with and symmetric to each other in the first direction and respectively have opened inboard distal ends distal from each other. The arcuate outboard rails are aligned with and symmetric to each other in the first direction and respectively have opened outboard distal ends distal from each other. The rail keys are respectively disposed at the inboard sides of the rail portions. Each rail key has a key body which is received in a respective one of the receiving slots, a sliding protrusion which projects from an outboard side of the key body in the second direction and which is matingly engaged with and slidable along a respective one of the arcuate inboard rails, and an arcuate key rail which is formed in an inboard side of the key body and opposite to the sliding protrusion in the second direction. The axle keys are respectively disposed at the inboard sides of the key bodies. Each axle key has an axle sliding portion which is matingly engaged with and slidable along the arcuate key rail, and a pivot portion which projects from the axle sliding portion in the second direction and which is journalled on the pivot section of the support shaft. The auxiliary extending frames are respectively disposed at the outboard sides of the rail portions. Each auxiliary extending frame has an auxiliary sliding portion which is matingly engaged with and slidable along a respective one of the arcuate outboard rails, and a connecting portion which is slidably connected with the sliding major surface of the support plate of the respective bracket.

The brackets are shiftable between an unfolded state, where the support surfaces are coplanar with each other, and a folded state, where the support surfaces face and are spaced apart from each other. During shifting of the brackets from the unfolded state to the folded state, at the inboard sides of the rail portions, the axle keys are slid along the arcuate key rails to bring the rail keys into sliding along the arcuate inboard rails, and at the outboard sides of the rail portions, the auxiliary extending frames are slid along the arcuate outboard rails. To the folded state, the brackets are slid relative to the auxiliary extending frames in a direction away from the rail seat.

With adjustment of rotating axes and curvatures of the arcuate inboard rails and the arcuate key rails, the moving paths of the axle keys and the rail keys are adjusted to vary the degree of the sliding of the brackets relative to the auxiliary extending frames to meet the requirement of bending of the flexible display.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
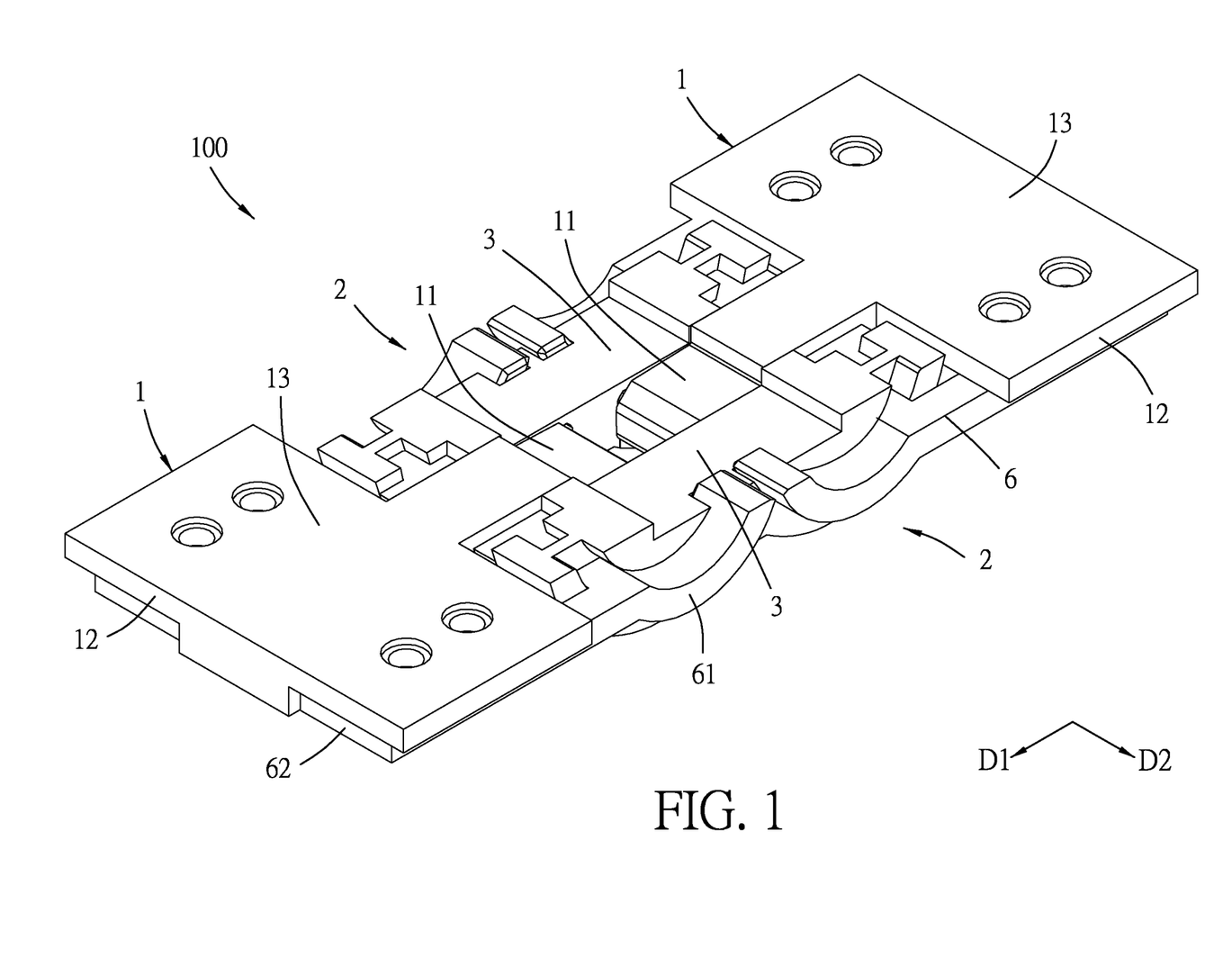
FIG. 1 is a perspective view illustrating an embodiment of a hinge according to the disclosure.
Figure 2:
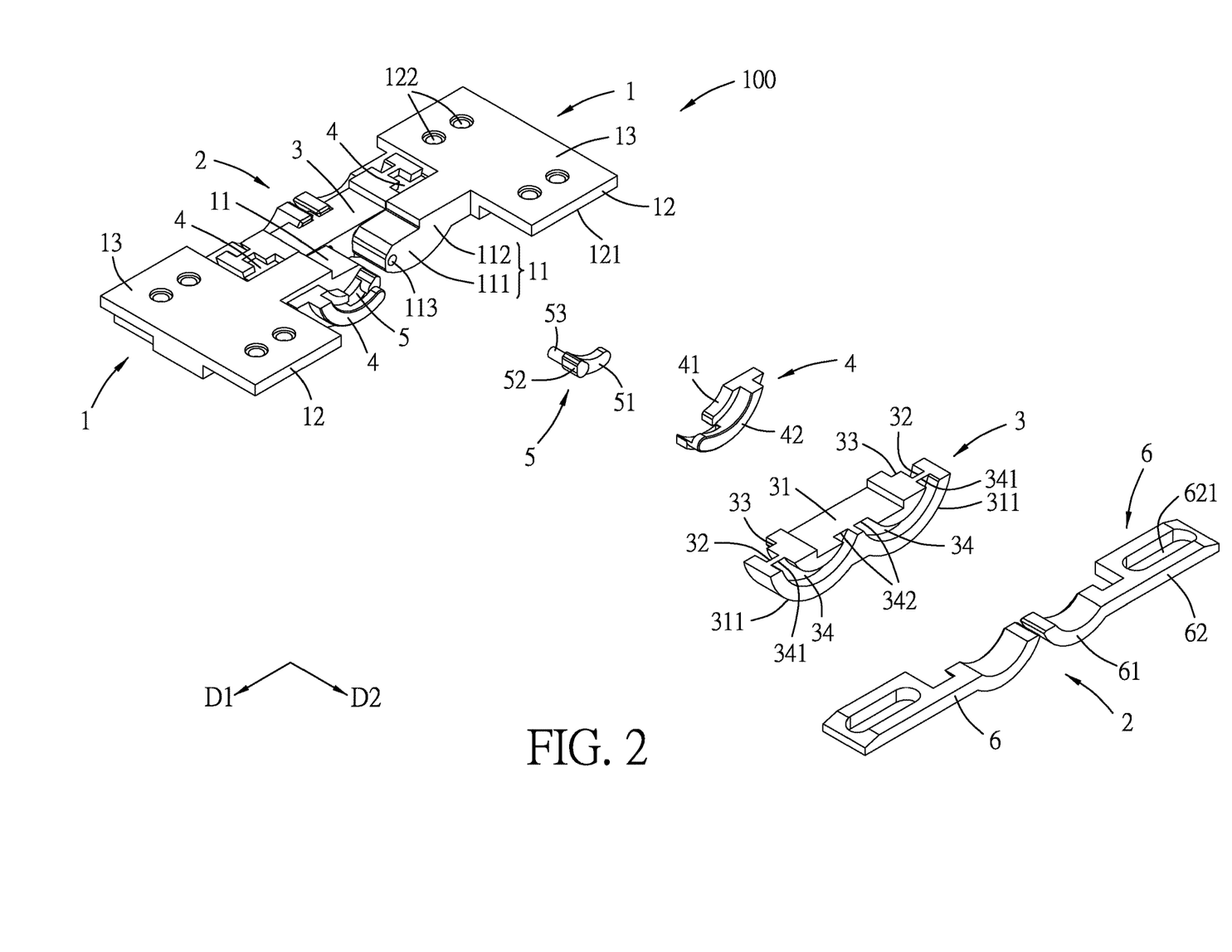
FIG. 2 is an exploded perspective view of the embodiment.
Figure 3:
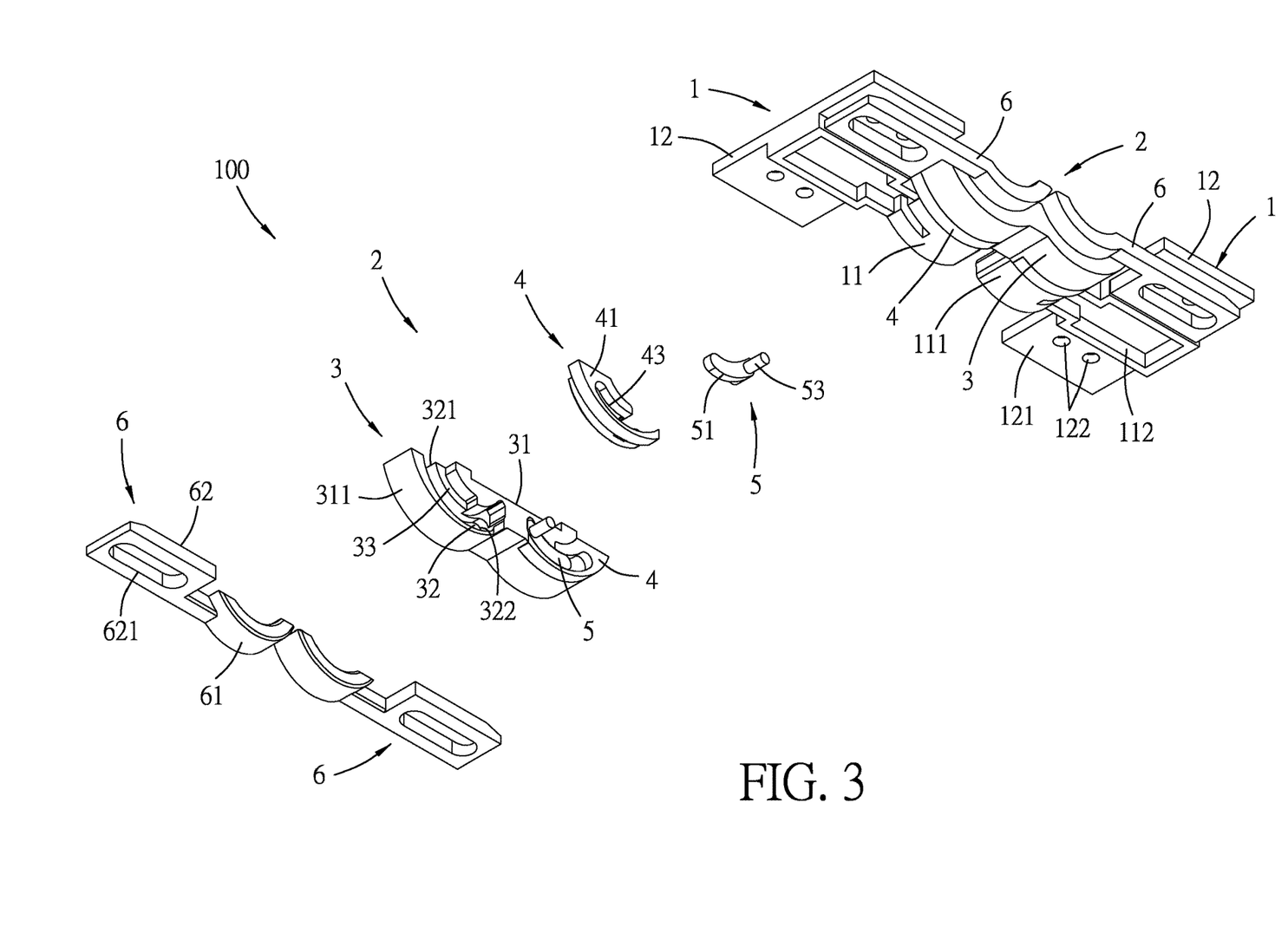
FIG. 3 is an exploded perspective view of the embodiment taken from another angle.

Referring to FIGS. 1 to 3, an embodiment of a hinge 100 according to the disclosure is adapted to support a flexible display (not shown). The hinge 100 includes two brackets 1 and two sliding modules 2.

The two brackets 1 are disposed and spaced apart from and symmetric to each other in a first direction (D1). Each bracket 1 has a support shaft 11 which extends in the first direction (D1) to have a pivot section 111 and a carry section 112, and a support plate 12 which is connected with and extends from the carry section 112 in the first direction (D1). The support plate 12 has a major surface which cooperates with the carry section 112 to define a support surface 13 for supporting a flexible display (not shown), and a sliding major surface 121 which is opposite to the support surface 13. The support plate 12 has a plurality of mounting holes 122 each of which extends from the sliding major surface 121 through the support surface 13 for extending of a fastener (not shown) therethrough. The brackets 1 are disposed in the first direction (D1) and have the pivot sections 111 proximate to and spaced apart from each other in the first direction (D1).

The two sliding modules 2 are respectively disposed at two opposite sides of the brackets 1 and are symmetric to each other in a second direction (D2) that is transverse to the first direction (D1). In this embodiment, the sliding modules 2 are respectively connected with two opposite sides of the brackets 1 in the second direction (D2) to permit rotation of each bracket 1 about an axis parallel to the second direction (D2).

Each sliding module 2 includes a rail seat 3, two rail keys 4, two axle keys 5 and two auxiliary extending frames 6.

Figure 4:
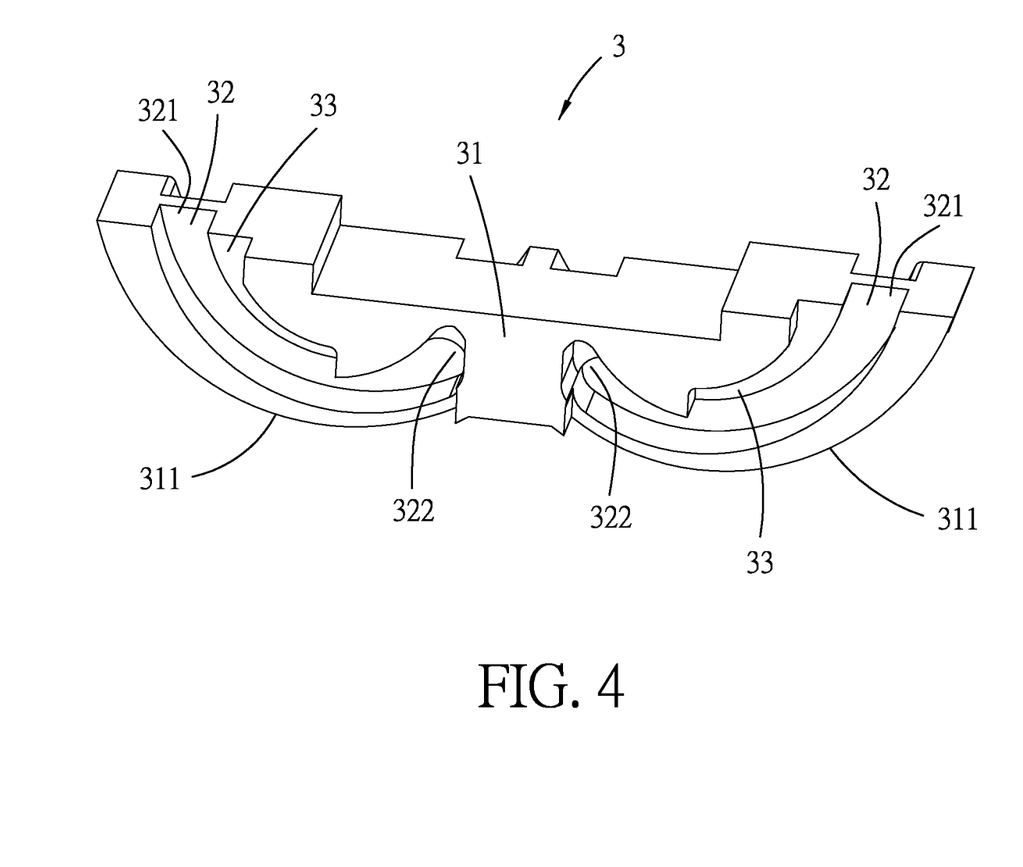
FIG. 4 is a perspective view of a rail seat of the embodiment.

With reference to FIGS. 2 and 4, the rail seat 3 has a seat body 31 which is disposed outboard of the brackets 1 in the second direction (D2), and which has two rail portions 311 that are respectively aligned with the pivot sections 111 of the brackets 1 in the second direction (D2), two arcuate inboard rails 32 which are respectively formed in inboard sides of the rail portions 311 (i.e., the sides proximate to the pivot sections 111), two receiving slots 33 which are respectively formed in the inboard sides of the rail portions 311 and in spatial communication with the arcuate inboard rails 32, respectively, and which are closer to the pivot sections 111 than the arcuate inboard rails 32, and two arcuate outboard rails 34 which are respectively formed in outboard sides of the rail portions 311 (i.e., the sides distal from the pivot sections 111). The arcuate inboard rails 32 are aligned with and symmetric to each other in the first direction (D1), and respectively have opened inboard distal ends 321 distal from each other, and closed inboard proximate ends 322 proximate to each other. The arcuate outboard rails 34 are aligned with and symmetric to each other in the first direction (D1), and respectively have opened outboard proximate ends 342 proximate to each other, and opened outboard distal ends 341 distal from each other.

Figure 5:
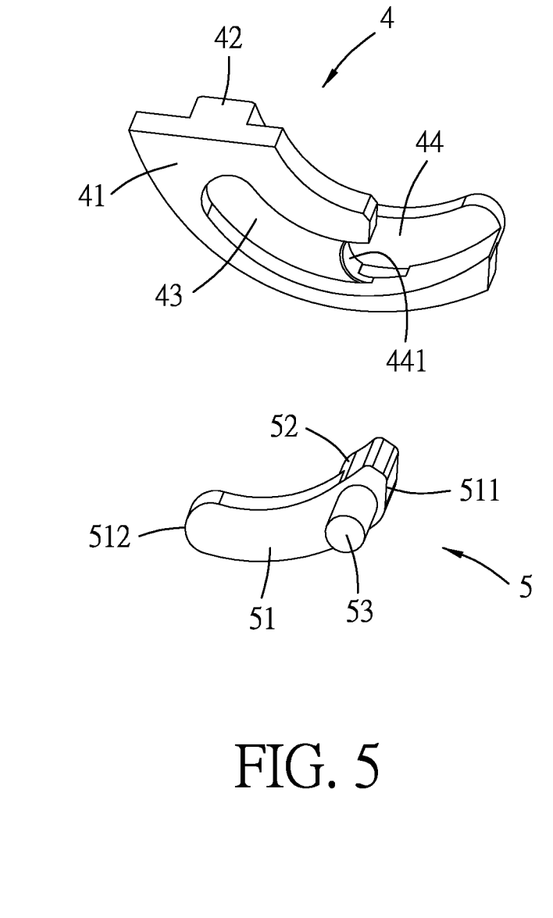
FIG. 5 is an exploded perspective view of a rail key and an axle key of the embodiment.

With reference to FIGS. 2, 3 and 5, the two rail keys 4 are respectively disposed at the inboard sides of the rail portions 311. Each rail key 4 has a key body 41 which is received in the respective receiving slot 33 of the rail seat 3, an arcuate sliding protrusion 42 which projects from an outboard side of the key body 41 in the second direction (D2) and which is matingly engaged with and slidable along the respective arcuate inboard rail 32 of the rail seat 3, an arcuate key rail 43 which is formed in an inboard side of the key body 41 and opposite to the sliding protrusion 42 in the second direction (D2), and a leeway slot 44 which is recessed in the key body 41 and in spatial connection with the arcuate key rail 43. In this embodiment, the leeway slot 44 is recessed toward and closer to the arcuate sliding protrusion 42 so as to form an abutment end edge 441 at a juncture between the leeway slot 44 and the key rail 43.

The two axle keys 5 are respectively disposed at the inboard sides of the key bodies 41. In this embodiment, each axle key 5 has an arcuate axle sliding portion 51 which is matingly engaged with and slidable along the arcuate key rail 43, and which has first and second end portions 511, 512 respectively proximate to and distal from the other axle key 5, and a thrust portion 52 which is connected with and projects from the first end portion 511 in the second direction (D2) and which is received in and slidable along the leeway slot 44. The thrust portion 52 and the second end portion 512 cooperatively abut against and push the corresponding rail key 4 to make a sliding movement of the rail key 4 along the corresponding arcuate inboard rail 32. Each axle key 5 further has a pivot portion 53 in the form of a shaft which extends from the first end portion 511 of the axle sliding portion 51 and opposite to the thrust portion 52 in the second direction (D2). The pivot section 111 of each bracket 1 has an axial hole 113 for engaging the pivot portion 53 to permit rotation of the brackets 1 around the pivot portions 53.

With reference to FIGS. 1 to 3, the two auxiliary extending frames 6 are respectively disposed at the outboard sides of the rail portions 311 of the rail seat 3. In this embodiment, each auxiliary extending frame 6 has an arcuate auxiliary sliding portion 61 which is matingly engaged with and slidable along the respective arcuate outboard rail 34, and a connecting portion 62 which extends from an end of the auxiliary sliding portion 61 in the first direction (D1). The connecting portion 62 abuts against and is slidable relative to the sliding major surface 121 of the support plate 12 of the respective bracket 1, and has an elongated slot 621 which is aligned with the mounting holes 122 and which is elongated in the first direction (D1) for extending of the fasteners that are disposed in the mounting holes 122.

Figure 6:
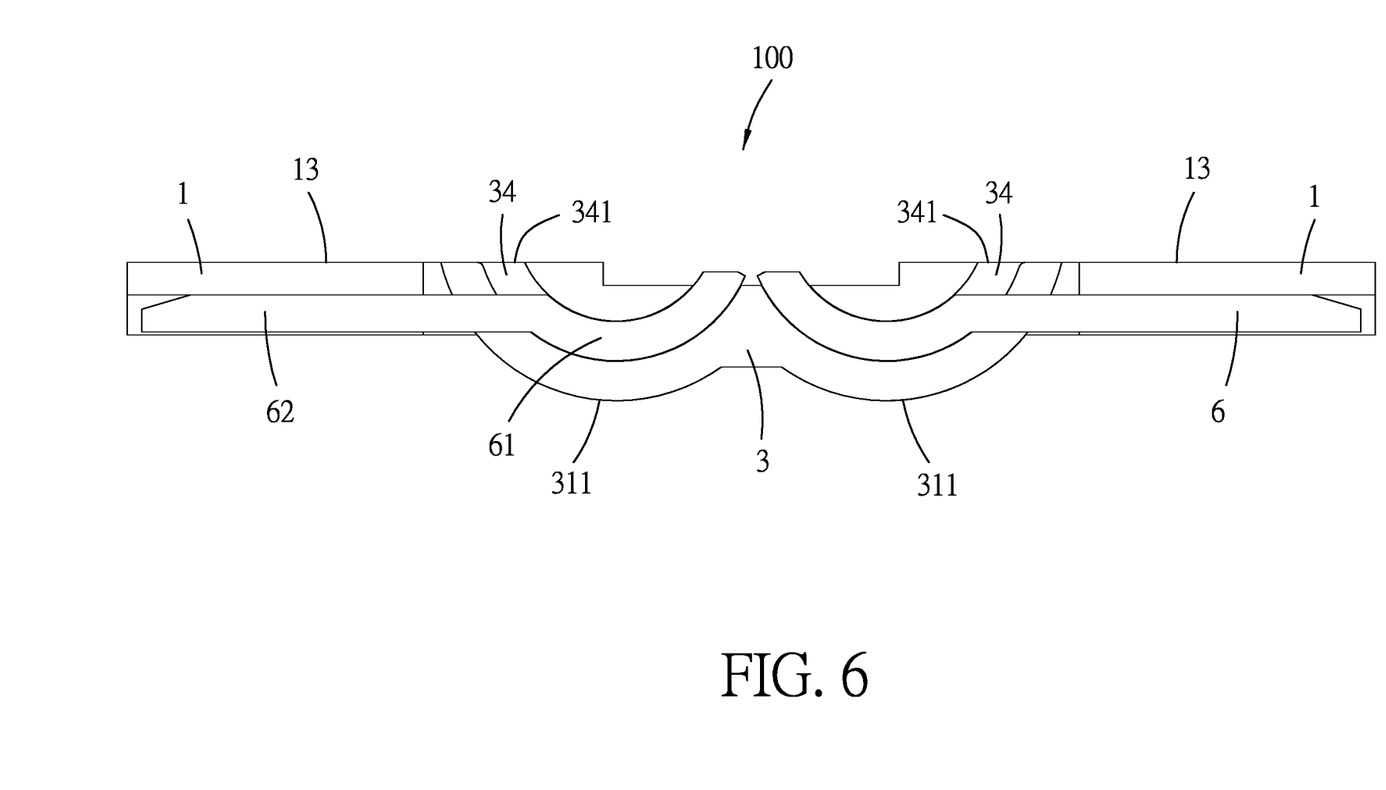
FIGS. 6 to 8 are side views illustrating the states when the embodiment is rotated from an unfolded state to a folded state.
Figure 7:
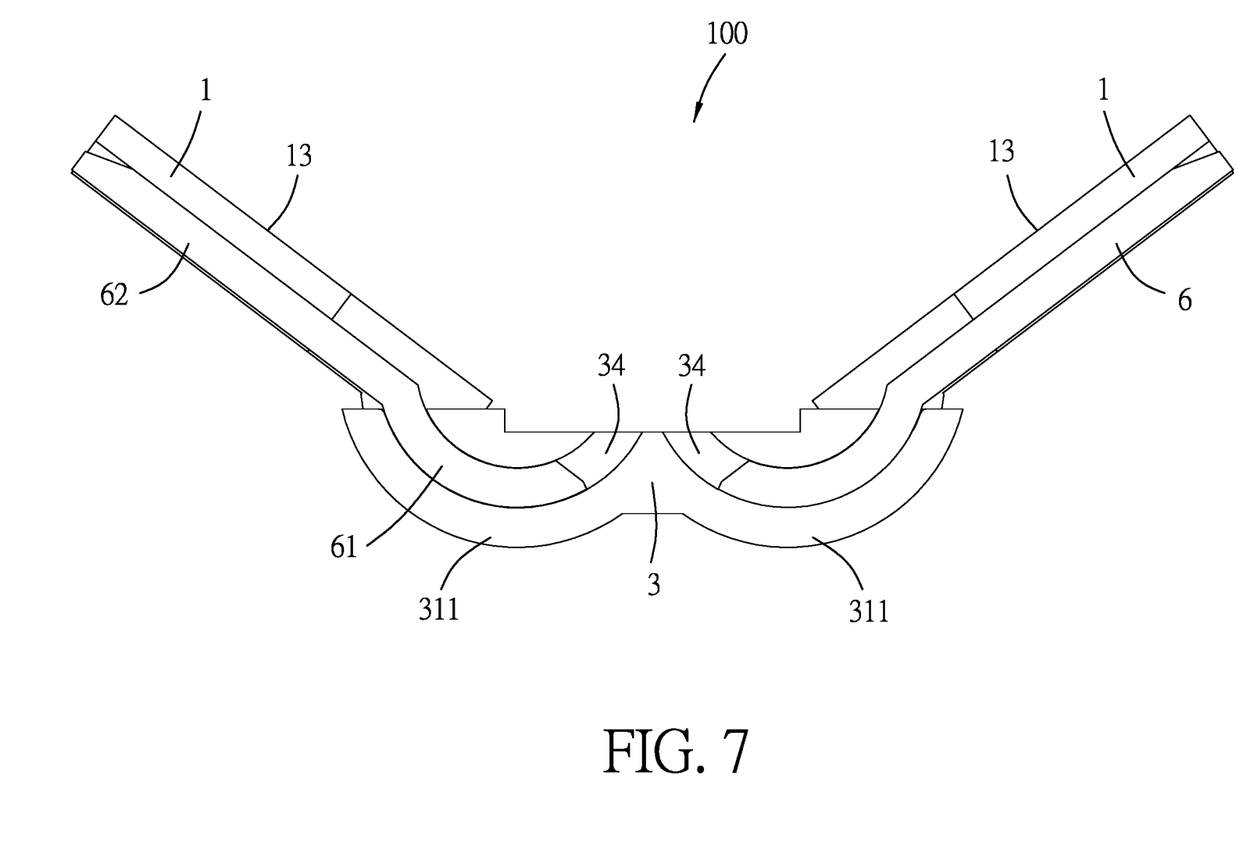
Figure 8:
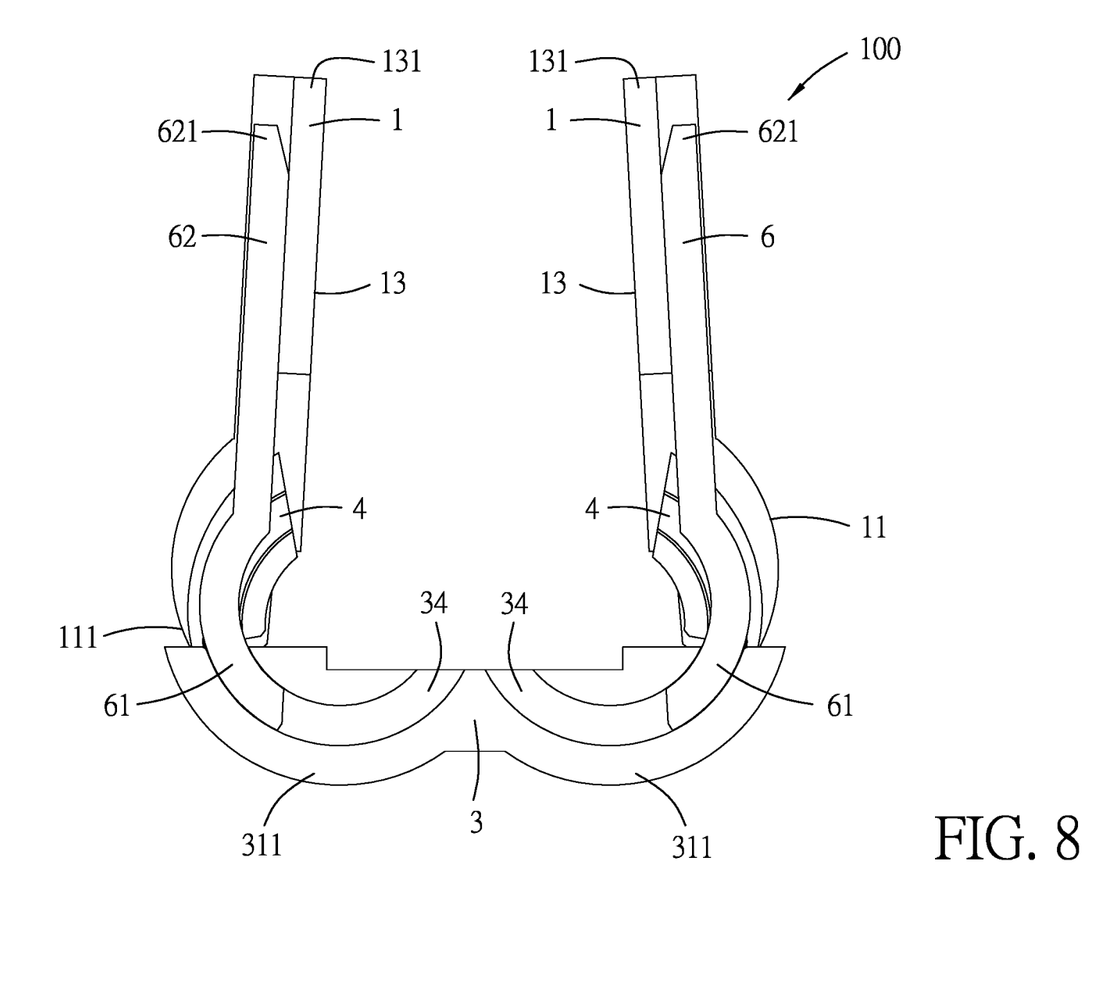

With reference to FIGS. 6 to 8, the brackets 1 are shiftable between an unfolded state (as shown in FIG. 6), where the support surfaces 13 are coplanar with each other, and a folded state (as shown in FIG. 8), where the support surfaces 13 face and are spaced apart from each other.

Figure 9:
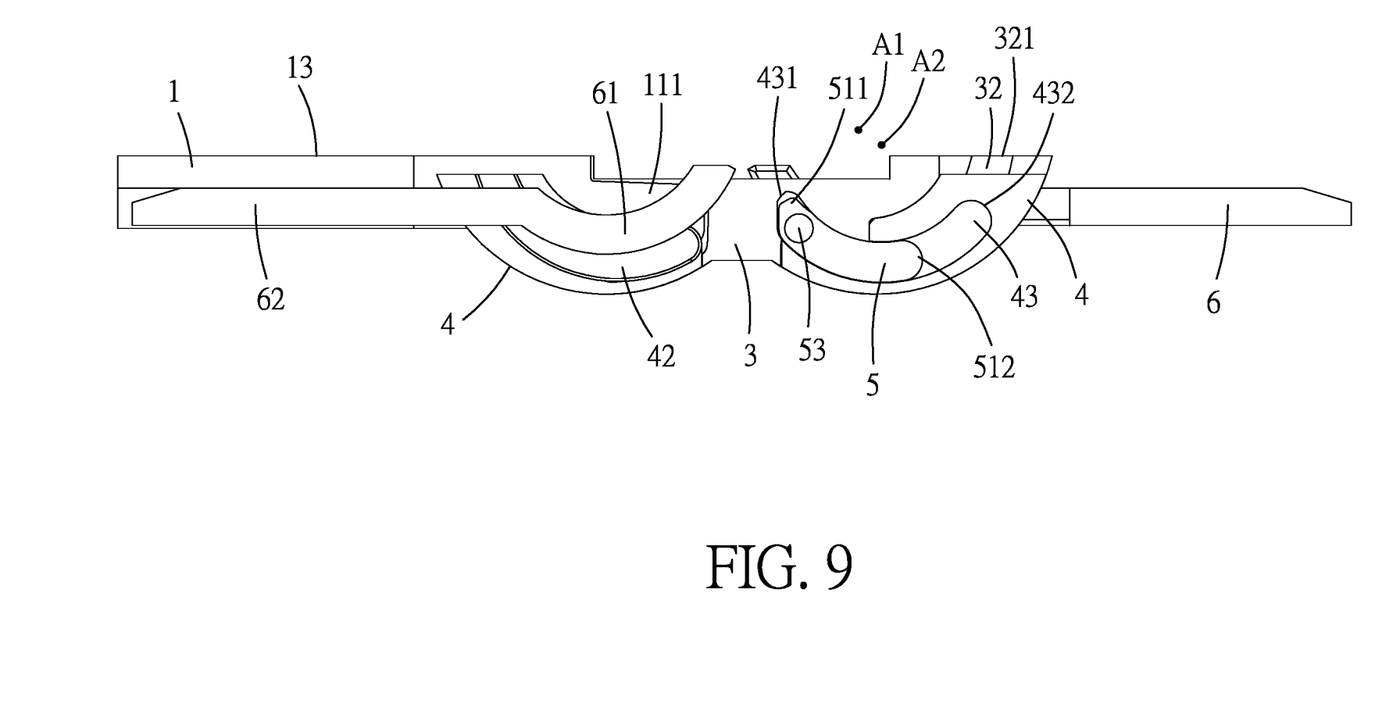
FIGS. 9 to 11 are side views respectively similar to FIGS. 6 to 8, wherein a bracket at a right side and part of a sliding module at a front side are removed for the sake of clarity.
Figure 10:
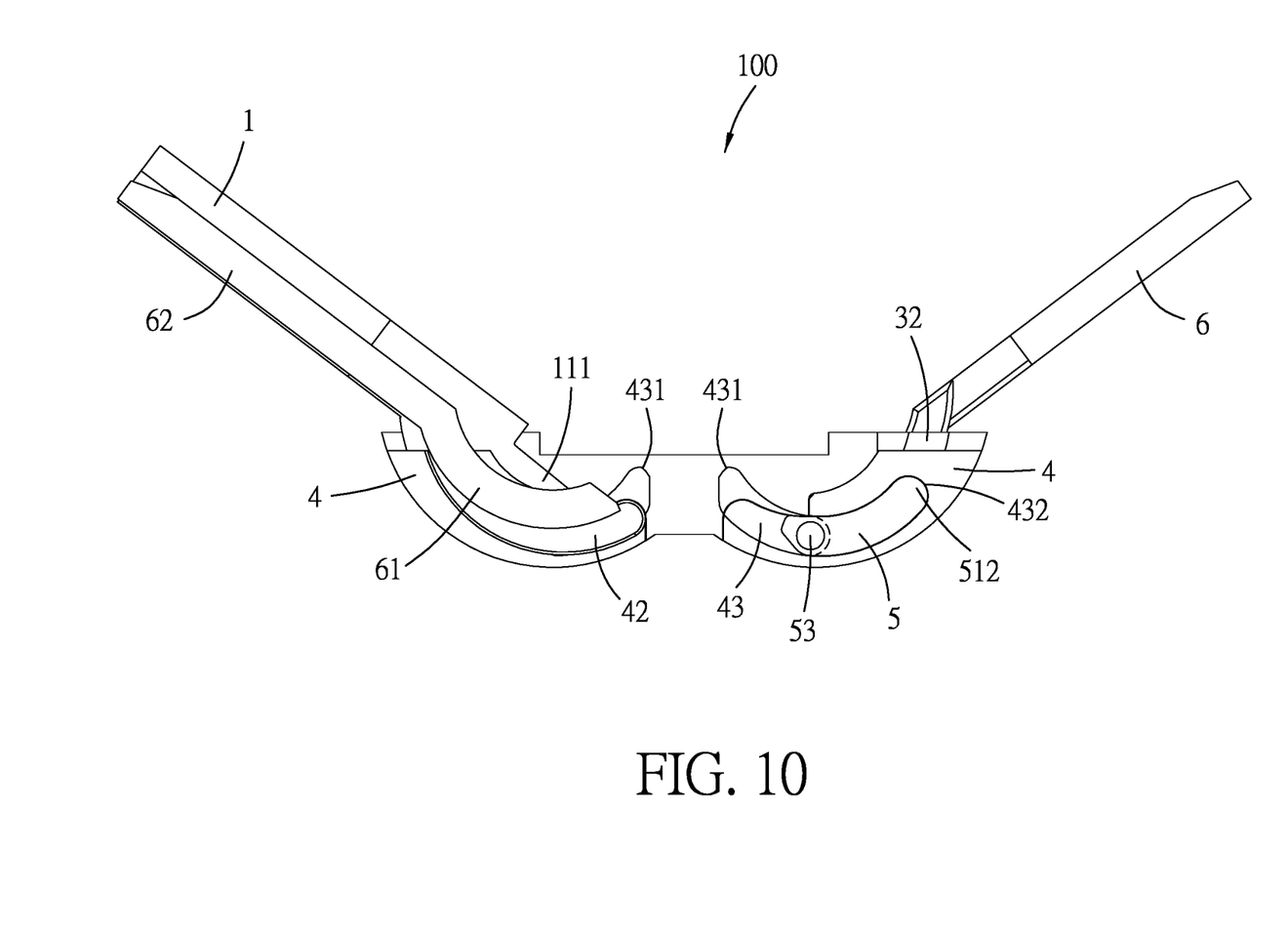
Figure 11:
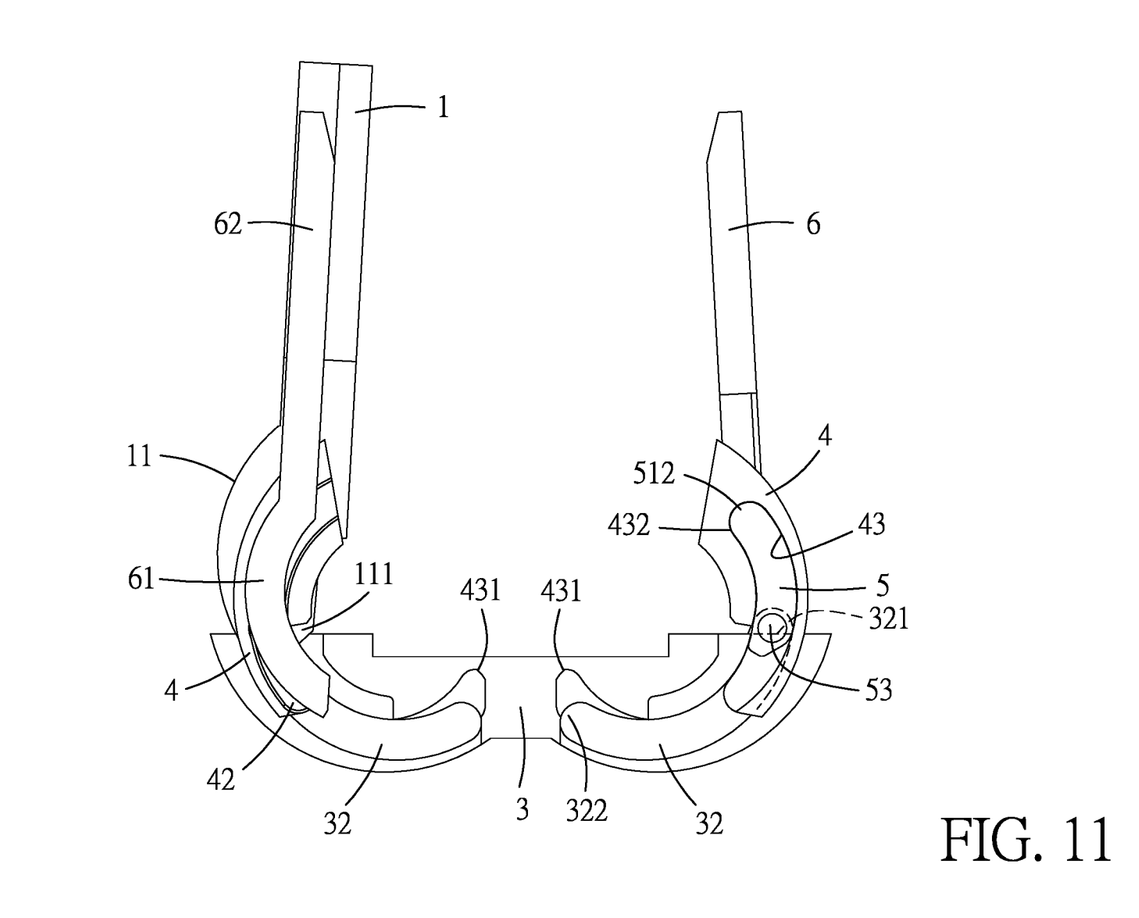

With reference to FIGS. 9 to 11, during shifting of the brackets 1 from the unfolded state to the folded state, at the inboard sides of the rail portions 311 of the rail seat 3, the axle keys 5 are actuated by the brackets 1 to be slid along the arcuate key rails 43 to then bring the rail keys 4 into sliding along the arcuate inboard rails 32. In this embodiment, each arcuate key rail 43 has a proximate end 431 proximate to the other arcuate key rail 43, and a distal end 432 opposite to the proximate end 431. Part of the proximate end 431 is bordered by a middle portion of the rail seat 3. As shown in FIG. 9, in the unfolded state, the first end portions 511 of the axle keys 5 are placed in the proximate ends 431 of the arcuate key rails 43 and abut against the middle portion of the rail seat 3. As shown in FIG. 10, when the brackets 1 are rotated about 45 degrees, the axle keys 5 are slid along the arcuate key rails 43 to have the second end portions 512 placed in the distal ends 432 of the arcuate key rails 43 and abutting against border walls of the distal ends 432. During this, also referring to FIG. 5, the thrust portions 52 of the axle keys 5 are slid along the leeway slots 44 to abut against the abutment end edges 441. As shown in FIG. 11, when the brackets 1 are rotated to the folded state, the axle keys 5 thrust the corresponding rail keys 4 to slide the rail keys 4 along the arcuate inboard rails 32 so as to have the rail keys 4 protruding from the opened inboard distal ends 321 of the arcuate inboard rails 32. During the shifting of the brackets 1 from the unfolded state to the folded state, the pivot sections 111 of the brackets 1 are moved with the pivot portions 53 of the axle keys 5 and rotated about the corresponding pivot portions 53, and the pivot portions 53 are moved along the arcuate key rails 43 and then moved along the arcuate inboard rails 32 so as to move the rotating axes of the brackets 1 along with the movement of the pivot portions 53. Each arcuate inboard rail 32 extends around a first rotating axis (A1) which extends in the second direction (D2). Each arcuate key rail 43 extends around a second rotating axis (A2) which extends in the second direction (D2) and which is parallel to the first rotating axis (A1). In this embodiment, the second rotating axis (A2) is offset from the first rotating axis (A1) such that the rotating angle of the brackets 1 during the shifting can be enabled to meet the bending requirement of the flexible display to decrease the degree of tension and depression of the flexible display and to hence reduce the risk of damage to the flexible display. Moreover, a curvature of each arcuate inboard rail 32 is different from a curvature of each arcuate key rail 43. Alternatively, the curvatures of each arcuate inboard rail 32 and each arcuate key rail 43 may be made the same in accordance with the bending requirement of the flexible display.

Referring again to FIGS. 6 to 8, during the shifting of the brackets 1 from the unfolded state to the folded state, at the outboard sides of the rail portions 311 of the rail seat 3, the auxiliary extending frames 6 are actuated by the brackets 1 to be slid along the arcuate outboard rails 34. As shown in FIG. 8, to the folded state, the brackets 1 are slid relative to the auxiliary extending frames 6 in a direction away from the rail seat 3. That is, distal ends 131 of the brackets 1 are higher than distal ends 621 of the auxiliary extending frames 6. Also, as shown in FIG. 11, the brackets 1 bring the axle keys 5 and the rail keys 4 to protrude outwardly of the rail seat 3 from the opened inboard distal ends 321 of the arcuate inboard rails 32. Specifically, with the brackets 1 slidable relative to the auxiliary extending frames 6, and pivotably connected with the axle keys 5, the pivot portions 53 of the axle keys 5 are moved when the brackets 1 are slid relative to the auxiliary extending frames 6 and rotated relative to the pivot portions 53 so as to bring the pivot portions 53 higher than the rail seat 3. Thus, the degrees of protrusion of the axle keys 5 and the rail keys 4 from the rail seat 4 are increased. That is, the degrees of displacement of the axle keys 5 and the rail keys 4 are increased. With the distal ends 131 of the brackets 1 remoter from the rail seat 3, that is, with increasing of the distance between the distal ends 131 of the brackets 1 and the rail seat 3, the flexible display is stretched more upwardly to decrease the curvature of the bending thereof near the rail seat 3. In other words, with adjustment of the rotating axes and the curvatures of the arcuate inboard rails 32 and the arcuate key rails 43, the moving paths of the axle keys 5 and the rail keys 4 are adjusted to vary the degree of the sliding of the brackets 1 relative to the auxiliary extending frames 6 to meet the requirement of bending of the flexible display.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge comprising:
   two brackets, each having a support shaft which extends in a first direction to have a pivot section and a carry section, and a support plate which is connected with and extends from said carry section in the first direction, said support plate having a major surface which cooperates with said carry section to define a support surface for supporting a flexible display, and a sliding major surface which is opposite to said support surface, said brackets being disposed in the first direction and having said pivot sections proximate to and spaced apart from each other in the first direction; and
   at least one sliding module including
      a rail seat having a seat body which is disposed outboard of said brackets in a second direction that is transverse to the first direction, and which has two rail portions that are respectively aligned with said pivot sections of said brackets in the second direction, two arcuate inboard rails which are respectively formed in inboard sides of said rail portions, two receiving slots which are respectively formed in said inboard sides of said rail portions and in spatial communication with said arcuate inboard rails, respectively, and which are closer to said pivot sections than said arcuate inboard rails, and two arcuate outboard rails which are respectively formed in outboard sides of said rail portions, said arcuate inboard rails being aligned with and symmetric to each other in the first direction and respectively having opened inboard distal ends distal from each other, said arcuate outboard rails being aligned with and symmetric to each other in the first direction and respectively having opened outboard distal ends distal from each other,
      two rail keys respectively disposed at said inboard sides of said rail portions, each of said rail keys having a key body which is received in a respective one of said receiving slots, a sliding protrusion which projects from an outboard side of said key body in the second direction and which is matingly engaged with and slidable along a respective one of said arcuate inboard rails, and an arcuate key rail which is formed in an inboard side of said key body and opposite to said sliding protrusion in the second direction,
      two axle keys respectively disposed at said inboard sides of said key bodies, each of said axle keys having an axle sliding portion which is matingly engaged with and slidable along said arcuate key rail, and a pivot portion which projects from said axle sliding portion in the second direction and which is journalled on said pivot section of said support shaft of a respective one of said brackets, and
      two auxiliary extending frames respectively disposed at said outboard sides of said rail portions, each of said auxiliary extending frames having an auxiliary sliding portion which is matingly engaged with and slidable along a respective one of said arcuate outboard rails, and a connecting portion which is slidably connected with said sliding major surface of said support plate of a respective one of said brackets, wherein
   said brackets are shiftable between an unfolded state, where said support surfaces are coplanar with each other, and a folded state, where said support surfaces face and are spaced apart from each other,
   during shifting of said brackets from the unfolded state to the folded state, at said inboard sides of said rail portions, said axle keys are slid along said arcuate key rails to bring said rail keys into sliding along said arcuate inboard rails, and at said outboard sides of said rail portions, said auxiliary extending frames are slid along said arcuate outboard rails, and further, during shifting of said brackets from the unfolded state to the folded state, said brackets are slid relative to said auxiliary extending frames in a direction away from said rail seat.

2. The hinge as claimed in claim 1, wherein said hinge comprises two of said sliding modules which are respectively disposed at two sides of said brackets in the second direction and symmetric to each other in the second direction.

3. The hinge as claimed in claim 1, wherein said auxiliary sliding portion of each of said auxiliary extending frames is arcuate to be matingly engaged with and slidable along a respective one of said arcuate outboard rails, and said connecting portion extends from an end of said auxiliary sliding portion in the first direction and abuts against and is slidable relative to said sliding major surface.

4. The hinge as claimed in claim 3, wherein said support plate of each of said brackets has at least one mounting hole which extends from said sliding major surface through said support surface for extending of a fastener therethrough, said connecting portion of each of said auxiliary extending frames having an elongated slot which is aligned with said mounting hole and which is elongated in the first direction.

5. The hinge as claimed in claim 1, wherein each of said arcuate inboard rails extends around a first rotating axis which extends in the second direction, said arcuate key rail of each of said rail keys extending around a second rotating axis which extends in the second direction and which is parallel to and offset from the first rotating axis.

6. The hinge as claimed in claim 5, wherein a curvature of each of said arcuate inboard rails is different from a curvature of said arcuate key rail.

7. The hinge as claimed in claim 1, wherein each of said rail keys further has a leeway slot which is recessed in said key body and in spatial connection with said arcuate key rail, said axle sliding portion of each of said axle keys being arcuate to be matingly engaged with and slidable along said arcuate key rail and having first and second end portions which are respectively proximate to and distal from other one of said axle keys, each of said axle keys further having a thrust portion which is connected with and projects from said first end portion in the second direction and which is received in and slidable along said leeway slot such that, during the shifting of said brackets from the unfolded state to the folded state, said thrust portion and said second end portion cooperatively abut against and push the corresponding one of said rail keys to make a sliding movement of said rail keys along said arcuate inboard rails.

8. The hinge as claimed in claim 7, wherein said pivot portion of each of said axle keys is in form of a shaft which extends from said first end portion of said axle sliding portion and opposite to said thrust portion in the second direction, said pivot section of each of said brackets having an axial hole for engaging with said pivot portion to permit rotation of said brackets around said pivot portions.

\* \* \* \* \*